(12) United States Patent
Suzuki et al.

(10) Patent No.: US 10,330,473 B2
(45) Date of Patent: Jun. 25, 2019

(54) VIBRATION GYRO HAVING BIAS CORRECTING FUNCTION, AND METHOD OF USING VIBRATION GYRO

(71) Applicant: Mitsubishi Precision Co., Ltd., Tokyo (JP)

(72) Inventors: Karebu Suzuki, Kanagawa (JP); Kenji Kobayashi, Kanagawa (JP); Tomohiro Fukuda, Kanagawa (JP); Syuji Nakashita, Kanagawa (JP)

(73) Assignee: MITSUBISHI PRECISION CO., LTD., Tokyo (JP)

( * ) Notice: Subject to any disclaimer, the term of this patent is extended or adjusted under 35 U.S.C. 154(b) by 133 days.

(21) Appl. No.: 15/666,228

(22) Filed: Aug. 1, 2017

(65) Prior Publication Data

US 2018/0058854 A1    Mar. 1, 2018

(30) Foreign Application Priority Data

Aug. 4, 2016    (JP) .................................. 2016-153949

(51) Int. Cl.
*G01C 19/5776* (2012.01)
*G01C 19/5712* (2012.01)
*G01C 19/5726* (2012.01)

(52) U.S. Cl.
CPC ..... *G01C 19/5712* (2013.01); *G01C 19/5726* (2013.01); *G01C 19/5776* (2013.01)

(58) Field of Classification Search
CPC ........................ G01C 19/5776; G01C 19/5726
See application file for complete search history.

(56) References Cited

U.S. PATENT DOCUMENTS

2013/0298670 A1    11/2013    Tsugai et al.

FOREIGN PATENT DOCUMENTS

| JP | 2013-253958 | 12/2013 |
|----|-------------|---------|
| JP | 2014-178195 | 9/2014 |
| JP | 2015-203604 | 11/2015 |
| JP | 2015-230281 | 12/2015 |
| WO | WO 2016/182993 A2 | 11/2016 |

*Primary Examiner* — John E Chapman, Jr.
(74) *Attorney, Agent, or Firm* — Hunton Andrews Kurth LLP

(57) ABSTRACT

A vibration gyro having high bias stability, and a method of using the gyro for obtaining a precise angular velocity signal by correcting the bias. The gyro has: a drive signal generating part configured to generate a multiplexed drive signal; first and second demodulation circuits configured to generate first and second demodulation signals, respectively; first and second control circuits configured to generate first and second feedback amplitude signals, respectively; a feedback signal generating part configured to generate a first multiplexed feedback signal by multiplexing a first feedback signal obtained by modulating the first feedback amplitude signal at the first frequency, and at least one second feedback signal obtained by modulating the second feedback amplitude signal at the at least one second frequency; and a subtracter configured to output an angular velocity signal by subtracting the second feedback amplitude signal from the first feedback amplitude signal.

6 Claims, 16 Drawing Sheets

VIBRATION GYRO HAVING BIAS CORRECTING FUNCTION, AND METHOD OF USING VIBRATION GYRO

CROSS-REFERENCE TO RELATED APPLICATIONS

The present application claims priority from Japanese Patent Application No. 2016-153949 filed on Aug. 4, 2016, the entire contents of which are fully incorporated herein by reference.

BACKGROUND OF THE INVENTION

1. Field of the Invention

The present invention relates to a vibration gyro, in particular, a high-performance vibration gyro having a bias correcting function, produced by a Micro-Electro-Mechanical-Systems (MEMS). The present invention also relates to a method of using the vibration gyro.

2. Description of the Related Art

Due to a micromachining technique rapidly developed since the 1990s, a large quantity of sensor structures can be produced in one process. For example, a bulk silicon wafer is bonded onto a silicon substrate having an insulating film or a glass substrate, and then the wafer is processed by chemical etching, such as wet etching or dry etching so as to form a mechanical sensor structure. As a sensor based on the MEMS technique, an acceleration sensor or a vibration gyro may be used, for example, in many fields including an automobile, inertia navigation, a digital camera, and a game machine, etc.

In particular, a vibration gyro utilizes Coriolis force generated when a movable article capable of vibrating in one direction is subject to rotational motion. When a vibrating movable mass is subject to rotational motion, the movable mass is subject to Coriolis force which acts in the direction perpendicular to both the vibrating direction and the rotational direction, and then the movable mass is displaced in the acting direction of the Coriolis force. The movable mass is supported by a spring which allows the mass to be displaced in the acting direction, and thus the Coriolis force and an angular velocity generating the Coriolis force can be detected based on the displacement of the movable mass. The displacement of the movable mass can be determined based on, for example, capacitance change of a parallel plate-type capacitor or a comb-type capacitor, having a pair of parallel plate structures or a pair of comb structures, wherein one of the structures is fixed and the other is movable together with the movable mass.

As a means for improving output stability of a vibration gyro, a means for reducing or eliminating an orthogonal bias value (i.e., a quadrature error or 90 degrees component) or a parallel bias value (i.e., a zero degree component) may be used. For example, JP 2013-253958 A, JP 2014-178195 A or JP 2015-203604 A discloses a vibration gyro having a means for correcting the orthogonal bias value. These documents describes that, with respect to rotational vibratory displacement due to structural or dynamical asymmetricity of a drive mass of the gyro, due to electrostatic force generated by applying AC voltage having an appropriate phase to a correction electrode positioned adjacent to a sense mass or by applying DC voltage to a correction electrode positioned adjacent to the drive mass, an output of the orthogonal bias can be reduced, whereby stability of the gyro can be significantly improved.

Further, JP 2015-230281 A discloses a vibration gyro having a means for correcting the parallel bias value. This document describes that, by driving the gyro by using a multiplexed signal including a plurality of frequencies, a correction signal, including only an undesired drive signal due to undesired driving force and/or an undesired signal such as a coupling signal due to parasitic capacitance, can be generated, whereby a precise angular velocity signal (or rate output) can be obtained by subtracting the correction signal from a rate signal.

The vibration gyro disclosed in JP 2013-253958 A, JP 2014-178195 A or JP 2015-203604 A has the means for reducing or correcting the orthogonal bias value (the quadrature error or 90 degrees component), and the phase of the orthogonal bias is shifted from the angular velocity signal by 90 degrees. However, the signals output from the vibration gyro may include not only the signal (or the 90 degree component such as the quadrature error) having the phase shifted from the angular velocity signal by 90 degrees, but also the undesired signal (or the zero degree component) having the phase equal to the phase of angular velocity signal.

On the other hand, the vibration gyro disclosed in JP 2015-230281 A has the correction means for: driving the gyro by using a second drive signal having a second frequency; detecting a response signal from the gyro; detecting only a parallel bias value (or zero degree component B) having the same phase as the angular velocity signal as a correction signal; driving the gyro by using a first drive signal having a first frequency; detecting a parallel bias value (or zero degree component A) detected from the response signal; and subtracting the zero degree component B from the angular velocity signal including zero degree component A. However, since detection gains of zero degree component B and zero degree component A are different from each other, it is necessary to amplify or attenuate zero degree component B by using a gain circuit so that the detection gains are equal to each other. Therefore, when an accuracy of adjustment of the gain circuit is relatively low, a sufficient effect of the correction may not be obtained.

SUMMARY OF THE INVENTION

An object of the present invention is to provide a vibration gyro having high bias stability, configured to: detect the parallel bias value (zero degree component) having the same phase as the angular velocity signal; conform the detection gain of the parallel bias value (zero degree component) to the detected angular velocity signal (including the parallel bias); and detect a precise angular velocity signal (not including the parallel bias) by subtracting the parallel bias value (zero degree component) from the angular velocity signal (including the parallel bias). Another object of the present invention is to provide a method of using the vibration gyro for obtaining a precise angular velocity signal by correcting the bias.

Accordingly, one aspect of the present invention provides a vibration gyro comprising: drive masses configured to be driven and vibrated; a sense mass configured to be displaced by a Coriolis force generated by an angular velocity; a drive signal generating part configured to generate a multiplexed drive signal by multiplexing a first drive signal and at least one second drive signal, the first drive signal having a first frequency corresponding to a resonance frequency of the drive masses, and the at least one second drive signal having at least one second frequency different from the first frequency; a first demodulation circuit configured to generate a first demodulation signal by demodulating a detection signal of the sense mass at the first frequency; at least one second demodulation circuit configured to generate at least one second demodulation signal by demodulating the detection signal of the sense mass at the at least one second frequency; a first control circuit configured to generate a first feedback amplitude signal from the first demodulation signal; a second control circuit configured to generate a second feedback amplitude signal from the at least one second demodulation signal; a feedback signal generating part configured to generate a first multiplexed feedback signal by multiplexing a first feedback signal and at least one second feedback signal, the first feedback signal being obtained by modulating the first feedback amplitude signal at the first frequency, and the at least one second feedback signal being obtained by modulating the second feedback amplitude signal at the at least one second frequency; and a subtracter configured to output an angular velocity (rate) signal by subtracting the second feedback amplitude signal from the first feedback amplitude signal.

In a preferred embodiment, the at least one second frequency includes a frequency $A_f$ higher than the first frequency and the resonance frequency of the sense mass, and a frequency $B_f$ lower than the first frequency and the resonance frequency of the sense mass; the at least one second drive signal includes a drive signal $A_{drs}$ having the frequency $A_f$ and a drive signal $B_{drs}$ having the frequency $B_f$; the at least one second demodulation signal includes a demodulation signal $A_{des}$ demodulated at the frequency $A_f$ and a demodulation signal $B_{des}$ demodulated at the frequency $B_f$; the second control circuit generates the second feedback amplitude signal by using a signal obtained by adding the demodulation signal $A_{des}$ to the demodulation signal $B_{des}$; and the at least one second feedback signal includes a feedback signal $A_{fs}$ obtained by modulating the second feedback amplitude signal at the frequency $A_f$ and a feedback signal $B_{fs}$ obtained by modulating the second feedback amplitude signal at the frequency $B_f$.

In a preferred embodiment, the vibration gyro further comprises: a third control circuit configured to generate a third feedback amplitude signal from a signal obtained by subtraction process of the demodulation signal $A_{des}$ and the demodulation signal $B_{des}$; a modulator configured to generate a second multiplexed feedback signal by modulating the third feedback amplitude signal at frequencies of the multiplexed drive signal; and a subtracter configured to obtain a signal by subtracting the second multiplexed feedback signal from the detection signal of the sense mass, and feedback the obtained signal to the first and second demodulation circuits.

Another aspect of the present invention provides a method of using a vibration gyro including drive masses configured to be driven and vibrated and a sense mass configured to be displaced by a Coriolis force generated by an angular velocity, the method comprising the steps of: generating a multiplexed drive signal by multiplexing a first drive signal and at least one second drive signal, the first drive signal having a first frequency corresponding to a resonance frequency of the drive masses, and the at least one second drive signal having at least one second frequency different from the first frequency; generating a first demodulation signal by demodulating a detection signal of the sense mass at the first frequency; generating at least one second demodulation signal by demodulating the detection signal of the sense mass at the at least one second frequency; generating a first feedback amplitude signal from the first demodulation signal; generating a second feedback amplitude signal from the at least one second demodulation signal; generating a first feedback signal by modulating the first feedback amplitude signal at the first frequency; generating at least one second feedback signal by modulating the second feedback amplitude signal at the at least one second frequency; generating a first multiplexed feedback signal by multiplexing the first feedback signal and the at least one second feedback signal, the first multiplexed feedback signal being fed back to the vibration gyro; and outputting an angular velocity signal obtained by subtracting the second feedback amplitude signal from the first feedback amplitude signal.

In a preferred embodiment, the at least one second frequency includes a frequency $A_f$ higher than the first frequency and the resonance frequency of the sense mass, and a frequency $B_f$ lower than the first frequency and the resonance frequency of the sense mass; the at least one second drive signal includes a drive signal $A_{drs}$ having the frequency $A_f$ and a drive signal $B_{drs}$ having the frequency $B_f$; the at least one second demodulation signal includes a demodulation signal $A_{des}$ demodulated at the frequency $A_f$ and a demodulation signal $B_{des}$ demodulated at the frequency $B_f$; the method further comprises the step of: generating the second feedback amplitude signal by using a signal obtained by adding the demodulation signal $A_{des}$ to the demodulation signal $B_{des}$, wherein the at least one second feedback signal includes a feedback signal $A_{fs}$ obtained by modulating the second feedback amplitude signal at the frequency $A_f$, and a feedback signal $B_{fs}$ obtained by modulating the second feedback amplitude signal at the frequency $B_f$.

In a preferred embodiment, the method further comprises the steps of: generating a third feedback amplitude signal from a signal obtained by subtraction process of the demodulation signal $A_{des}$ and the demodulation signal $B_{des}$; generating a second multiplexed feedback signal by modulating the third feedback amplitude signal at frequencies of the multiplexed drive signal; and subtracting the second multiplexed feedback signal from the detection signal of the sense mass.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 1a is a plane view of an example of a basic structure of a vibration gyro according to the present invention;

FIG. 1b is a cross-sectional view of the gyro along a II-II line of FIG. 1a;

FIG. 1c is a cross-sectional view of the gyro along a III-III line of FIG. 1a;

DETAILED DESCRIPTIONS

Figure 1:
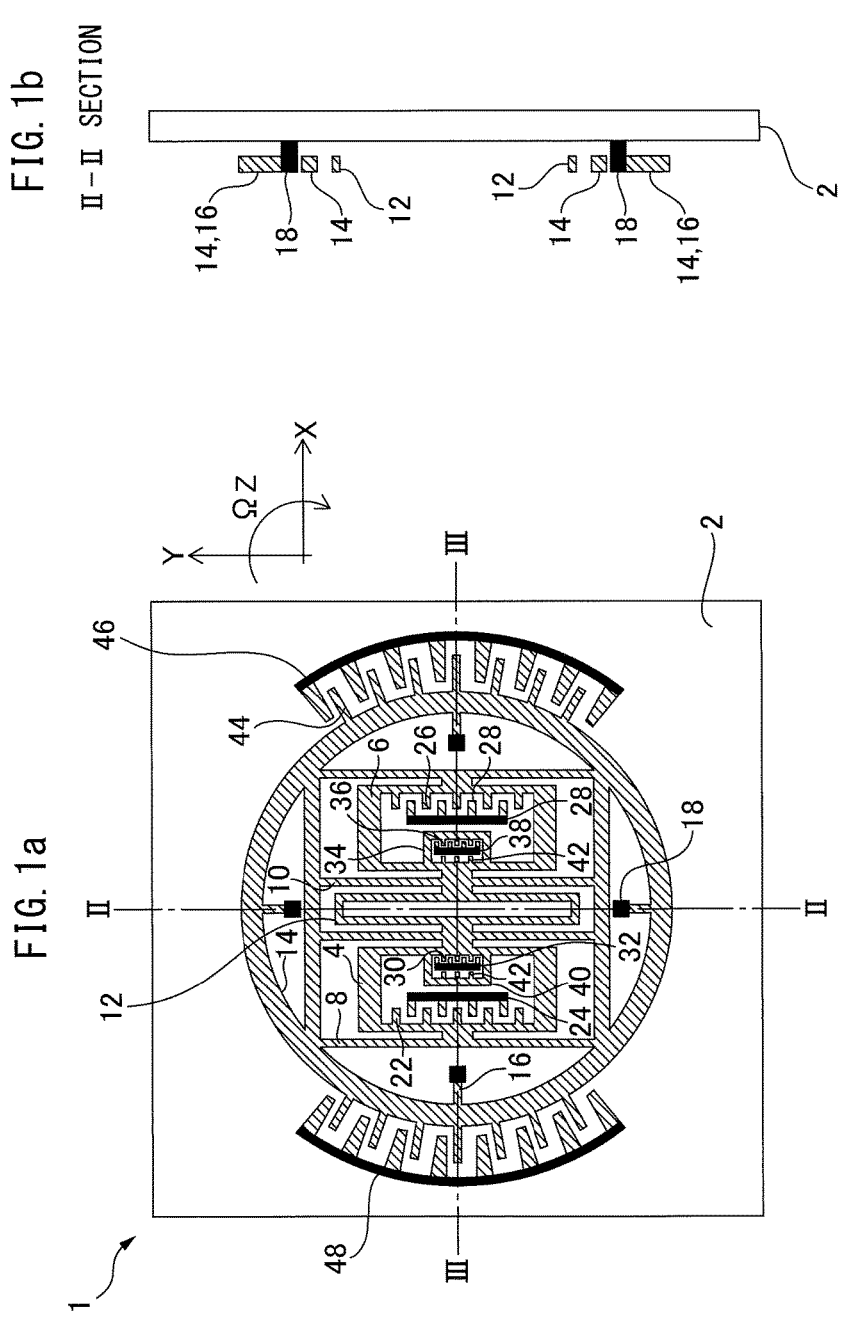

FIG. 1a is a plane view exemplifying a basic structure of a vibration gyro (or MEMS gyro element) 1 according to the present invention, and FIGS. 1b and 1c are cross-sectional view along II-II and III-III lines of FIG. 1a, respectively.

In each drawing, reference numeral 2 represents a substrate constituted by an insulating material such as glass, and other structural components of vibration gyro 1 are made from monocrystalline silicon. In vibration gyro 1 of FIGS. 1a to 1c, drive masses 4 and 6, made from monocrystalline silicon, positioned on left and right sides (in this case, drive mass 4 is positioned on the left side) are supported by at least one (four in the embodiment) drive supporting element 8 and at least one (four in the embodiment) drive supporting element 10, respectively, the supporting elements extending in a Y-direction. Drive supporting elements 8 and 10 are configured so that the rigidity thereof in a drive direction (an X-direction) or a horizontal direction parallel to a surface of substrate 2 is lower than the rigidity thereof in the other direction, whereby drive masses 4 and 6 are movable in the X-direction. Drive masses 4 and 6 are connected by a center connecting spring 12 which is an elastic connecting element.

The other ends of drive supporting elements 8 and 10, which are not connected to drive masses 4 and 6, respectively, are connected to a generally ring-shaped sense mass 14 which is arranged so as to surround drive masses 4 and 6. Sense mass 14 is supported by at least one (four in the embodiment) sense supporting element 16, and the other end of sense supporting element 16 is connected to a peripheral anchor 18 bonded to substrate 2. In the drawings, a black out section corresponds to a portion fixed to substrate 2, and the other section (a white or outlined section) corresponds to a portion which is movable or not fixed to the substrate.

Sense supporting element 16, which supports sense mass 14, is configured so that the rigidity of the element in a rotational direction with respect to the Z-axis perpendicular to the surface of substrate 2 is lower than the rigidity thereof in the other direction, whereby sense mass 14 is rotatably vibrated about the Z-axis. As shown in the cross-sectional views of FIGS. 1b and 1c, drive masses 4 and 6, drive supporting elements 8 and 10, center connecting element 12, sense mass 14, and sense supporting element 16 are opposed to substrate 2 with a predetermined gap therebetween.

As shown in FIG. 1a, drive mass 4 on the left side is a generally rectangular frame member, and has a comb electrode 22 extending from an outer side (away from the center) of the frame to a center side of the frame. Opposed to comb electrode 22, a left drive fixed comb electrode 24 is fixed to substrate 2, whereby left drive mass 4 can be driven and vibrated in the left-right direction (or the X-direction). Similarly, drive mass 6 on the right side is a generally rectangular frame member, and has a comb electrode 26 extending from an outer side (away from the center) of the frame to a center side of the frame. Opposed to comb electrode 26, a right drive fixed comb electrode 28 is fixed to substrate 2, whereby right drive mass 6 can be driven and vibrated in the left-right direction (or the X-direction).

Left drive mass 4 has a comb electrode 30 extending from the center side to the opposing side thereof, and opposed to comb electrode 30, a left drive monitor fixed comb electrode 32 is fixed to substrate 2, whereby an amount of displacement of left drive mass 4 can be measured. Further, right drive mass 6 has a comb electrode 36 extending to the center side from to the opposing side of a frame 34 arranged at the center side of right drive mass 6, and opposed to comb electrode 36, a right drive monitor fixed comb electrode 38 is fixed to substrate 2, whereby an amount of displacement of right drive mass 6 can be measured.

When an angular velocity (or an angular rate) about the Z-direction is input to vibration gyro 1, the drive masses on the left and right sides are rotatably vibrated as well as sense mass 14. Therefore, comb electrodes 30 and 36 arranged at the drive masses are also rotatably displaced, and then the positional relationships between comb electrodes 30 and 36 and drive monitor fixed comb electrodes 32 and 38, respectively, are varied. As a result, a capacitance between the opposing electrodes is changed, whereby a monitor output may be affected. Therefore, it is preferable that the monitoring mechanism for the drive masses (i.e., comb electrodes 30, 32, 36 and 38) be positioned as close to the (rotational) center of sense mass 14 as possible.

Apparent from FIG. 1a, the monitoring mechanism of left drive mass 4 (i.e., comb electrodes 30 and 32) and the monitoring mechanism of right drive mass 6 (i.e., comb electrodes 36 and 38) are not symmetrical with respect to the Y-axis. This is intended to constitute the left and right monitoring mechanisms as a so-called differential structure. Concretely, when the left and right drive masses are moved toward the center, the gap between opposing comb electrodes in the left monitoring mechanism becomes larger, and the gap between opposing comb electrodes in the right monitoring mechanism becomes smaller. In case that a drive AC voltage is applied to fixed comb electrodes 24 and 28, unnecessary monitor output may occur due to a coupling current which flows in the monitor comb electrode by a surrounding stray capacitance (parasitic capacitance). However, the above differential structure may eliminate or reduce the effect of the coupling current.

Due to the asymmetry of the left and right monitor electrodes as described above, moments of the left and right drive masses are different. Then, as shown in FIG. 1a, it is preferable that left drive mass 4 have a frame 40 symmetrical to frame 34, and have a dummy comb electrode 42 to which a voltage is not applied, so that the left and right drive masses are symmetrical.

As shown in FIG. 1a, sense mass 14 has a comb electrode 44 which radially and outwardly extends, and sense monitor fixed comb electrodes 46 and 48, which are opposed to comb electrode 44, are fixed to substrate 2. In detail, in a right region straddling first and fourth quadrants of the X-Y plane, sense monitor fixed comb electrode 46 is fixed opposed to a part of comb electrode 44 in the right region, and in a left region straddling second and third quadrants of the X-Y plane, sense monitor fixed comb electrode 48 is fixed opposed to a part of comb electrode 44 in the left region. Further, sense monitor fixed comb electrodes 46 and 48 constitute a differential mechanism. Concretely, when sense mass 14 rotates clockwise about the Z-axis, a gap between the opposing electrodes in the right region becomes larger, and a gap between the opposing electrodes in the left region becomes smaller. By virtue of such a differential mechanism using the change in capacitance between the two comb electrodes, a common mode noise generated in the sense mass can be canceled, whereby more accurate measurement may be carried out. In the vibration gyro as shown in FIG. 1a, the driving-vibration of the drive masses does not vibrate or excite the sense mass at the similar amplitude of vibration, i.e., the driving-vibration and the sensing-vibration are substantially separated. Therefore, a leakage output can be significantly reduced, and a bias value and/or the fluctuation thereof due to the leakage output can be limited.

Vibration gyro 1 as shown in FIG. 1a may be manufactured by using a micromachining process as follows.

First, a glass plate is processed by wet etching using hydrofluoric acid, etc., so that a predetermined gap (see FIGS. 1b and 1c) is formed between glass substrate 2 and the movable components of the gyro. In this regard, on an area of the glass plate not to be etched, i.e., other than a portion of the glass plate which will become the gap, a resist mask is formed by using a semiconductor photolithography technique, etc.

Next, the glass substrate and a silicon plate are bonded by anodic bonding technique, etc. In this step, the silicon plate is polished so that the silicon plate has a predetermined thickness, and selective spattering of conductive metals, such as Cr & Au, is carried out on an area which is to be a bonding pad, whereby an electrode pad (not shown) is formed.

Further, on the surface (polished surface) of the bonded silicon plate, a resist pattern as shown in the plane view of FIG. 1a is formed by a mask material such as a photoresist, by utilizing photolithography technique. Also, an area of the silicon plate not to be etched is protected by a resist mask.

Then, through-etching is carried out in the thickness direction of the silicon plate, by dry etching using an RIE facility, etc. A basic structure of the vibration gyro can be manufactured in the manufacturing process using the micromachining technique as described above.

As such, necessary materials for manufacturing the gyro are the silicon plate and the glass substrate only. By using the glass material having the generally same linear expansion coefficient as the silicon plate, structural strain (thermal strain) and/or stress (thermal stress) due to change in temperature is not likely to occur, whereby there is provided a vibration gyro which is structurally stable and has excellent property.

Next, the function of the vibration gyro will be explained. For example, when the sense mass having mass M is vibrated with velocity Vx in the X-direction, an absolute value of Coriolis force Fy in the Y-direction, which is generated when the sense mass is rotated about the Z-axis (at rotational angular velocity Ωz), is represented as following.

$$Fy = 2\Omega z \cdot M \cdot Vx$$

Therefore, in the vibration gyro for determining the angular velocity by detecting the displacement of the sense mass due to Coriolis force Fy, it is necessary to excite or vibrate the drive mass with velocity Vx. As the method therefor, a comb drive method using an electrostatic force may be used.

When a summation of DC voltage $V_{DC}$ and AC voltage $V_{AC}$ is applied between left drive mass 4 and left drive comb electrode 24, and between right drive mass 6 and right drive comb electrode 28, a driving force, having the same voltage cycle as $V_{AC}$, is generated. On the other hand, since left drive mass 4 and right drive mass 6 are connected to each other by elastic connecting spring 12, the drive masses represent anti-phase vibration mode wherein the drive masses move close to and away from each other. Therefore, by vibrating the drive masses while the frequency of $V_{AC}$ coincides with the resonance frequency of the anti-phase vibration mode, drive masses 4 and 6 represent the anti-phase vibration wherein the drive masses move close to and away from each other. Velocity Vx of this vibration is detected as a change in electrostatic capacitance via an electric circuit, by left and right monitor comb electrodes 32 and 38, and the detected velocity is used for AGC (auto gain control) for keeping the amplitude of the driving-vibration constant.

During left and right drive masses 4 and 6 are vibrated in the X-direction at the opposite phases, when angular velocity Ωz about the direction perpendicular to the plane of FIG. 1a (the Z-direction) is input, Coriolis force Fy in the Y-direction at the opposite phases is applied to the left and right drive masses. Due to the Coriolis force, a rotational torque about the Z-axis is applied to sense mass 14, and sense mass 14 is rotationally vibrated about the Z-axis. As a result, the electrostatic capacitance between comb electrode 44 arranged on sense mass 14 and first and second sense fixed comb electrodes 46 and 48 is varied in differential manner. In the present invention, when electrically reading the differential variation of the capacitance, extremely accurate angular velocity Ωz can be detected by extracting a pure angular velocity (rate) signal by using a multiplexed drive signal, as explained below.

Figure 2:
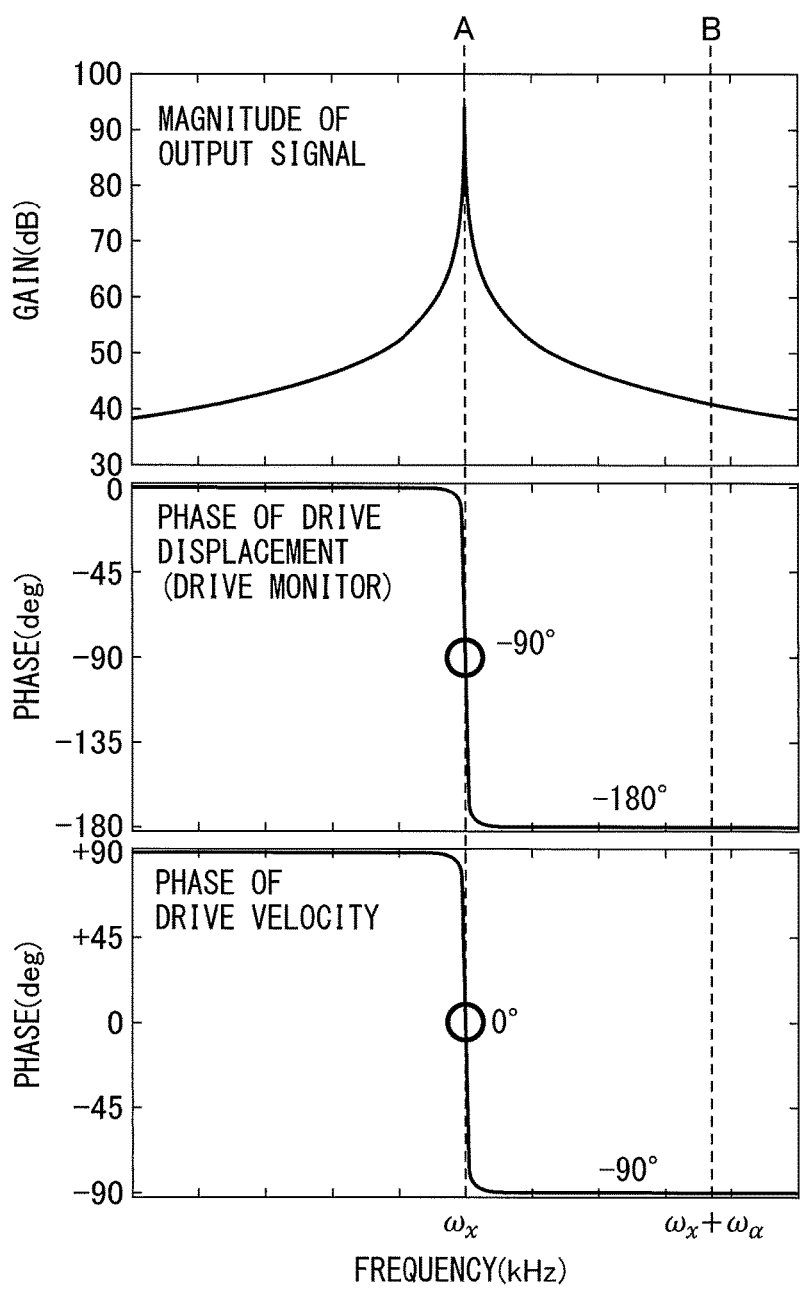
FIG. 2 is a graph showing frequency transfer characteristics of a drive system of the vibration gyro.

Hereinafter, a basic concept (frequency transfer characteristics of the drive masses and the sense mass, etc.) of the present invention will be explained with reference to FIGS. 2 to 8. First, FIG. 2 is a graph showing the frequency transfer characteristic of the drive system. Apparent from an (upper) graph in FIG. 2 showing a magnitude of an output signal, when the drive signal having a drive resonance frequency $\omega_x$ is input, a significantly large signal is output (section A in FIG. 2). In this case, a signal phase of the output of the drive displacement (drive monitor) relative to the input signal is −90 degrees, and a signal phase of the drive velocity is zero (see middle and lower phase graphs). This transfer characteristic is indicated in a block diagram of FIG. 3a. Hereinafter, the expression of the phase of the output signal ("90°" etc.) means a deviation of the phase (or a phase shift) of the output signal relative to the input signal.

Figure 3A:
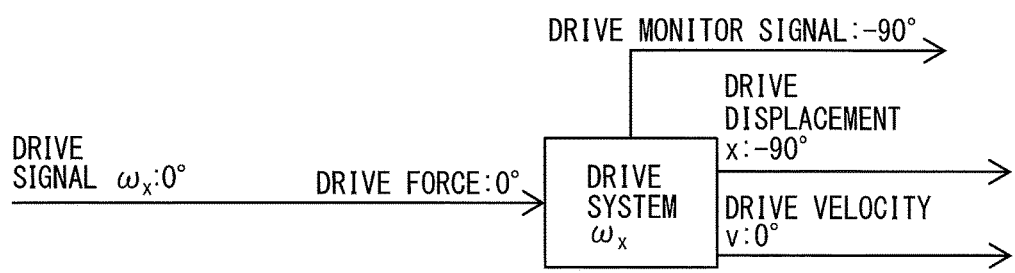
FIG. 3a is a block diagram showing transfer characteristics of the drive system of the gyro when a drive signal having a drive resonance frequency is input to the gyro.
Figure 3B:
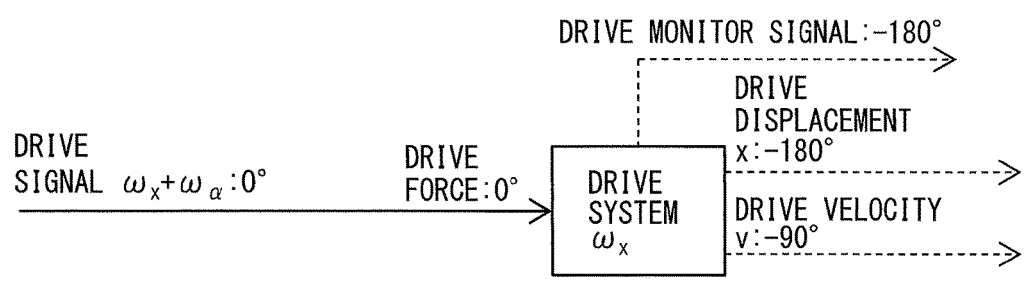
FIG. 3b is a block diagram showing transfer characteristics of the drive system of the gyro when a drive signal having a frequency higher than the drive resonance frequency is input to the gyro.

On the other hand, when the drive signal having a frequency (e.g., $(\omega_x+\omega_\alpha)$) higher than the drive resonance frequency is input, a considerably small signal is output (section B in FIG. 2), in comparison to the case that the drive signal having drive resonance frequency $\omega_x$ is input. An intensity of the output signal is considerably small relative to an intensity of a signal to be normally detected, and thus the intensity of the output signal is negligible in most cases. FIG. 3b is a block diagram in which such a negligible signal is indicated by a dotted line. With respect to the output phase of the signal which is negligible in most cases, the drive displacement (or the drive monitor) is −180°, and the drive velocity is −90° (see middle and lower phase graphs of FIG. 2). Also in block diagrams as explained below, the negligible signal is indicated by a dotted line.

Figure 4:
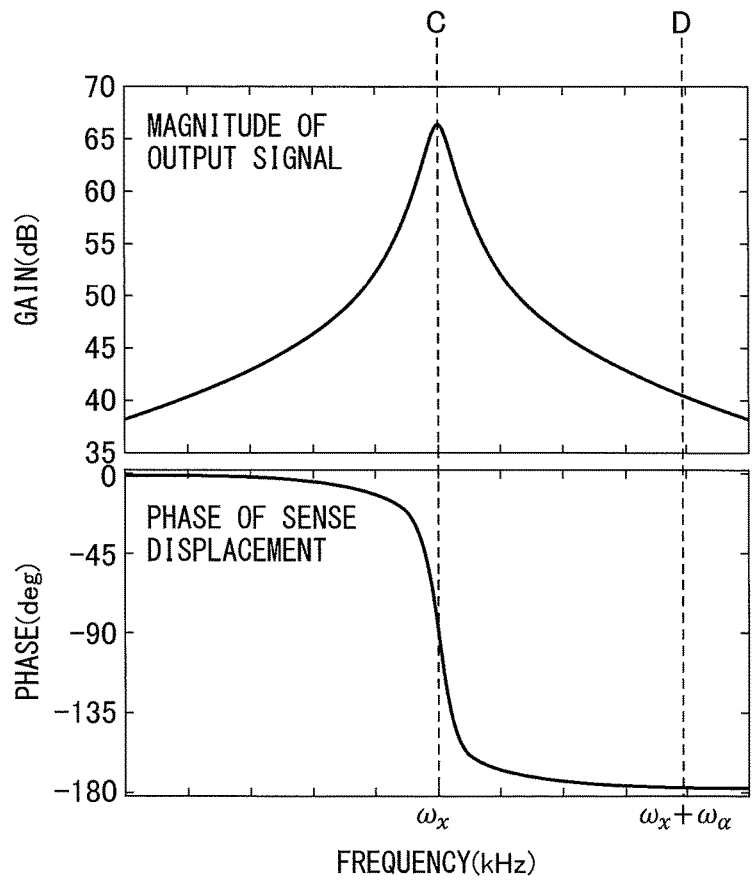
FIG. 4 is a graph showing frequency transfer characteristics of a sense system of the vibration gyro in a mode-matching state.
Figure 5A:
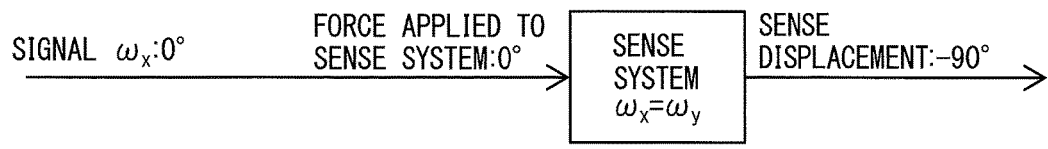
FIG. 5a is a block diagram showing transfer characteristics of the sense system of the gyro when the drive signal having the drive resonance frequency is input to the gyro in the mode-matching state.

FIG. 4 is a graph showing the frequency transfer characteristic of the sense system. Although the frequency transfer characteristic of the sense system is generally the same as that of the drive system, FIG. 4 shows that a Q factor (i.e., a quality factor representing sharpness of resonance characteristic) of the sense system is lower than the drive system. FIG. 4 also shows that drive system resonance frequency $\omega_x$ and sense system resonance frequency $\omega_y$ are coincide with each other (i.e., the mode-matching state). In this regard, with respect to the transfer characteristic when a signal having drive system resonance frequency $\omega_x$ is input, the phase of a signal representing the sense displacement is −90° (section C in FIG. 4). FIG. 5a is a block diagram showing the transfer characteristic corresponding to section C.

Figure 5B:
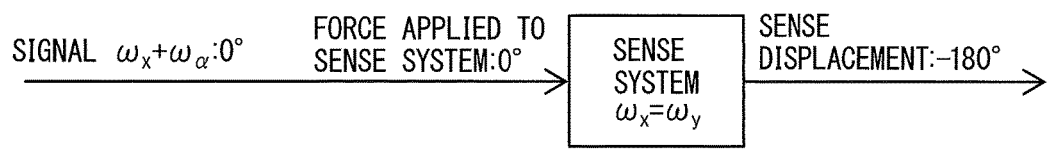
FIG. 5b is a block diagram showing transfer characteristics of the sense system of the gyro when the drive signal having the frequency higher than the drive resonance frequency is input to the gyro in the mode-matching state.

On the other hand, when the drive signal having the frequency (e.g., $(\omega_x+\omega_\alpha)$) higher than the drive resonance frequency (and the sense resonance frequency) is input, the phase of the output signal is delayed by −180° (section D in FIG. 4). FIG. 5b is a block diagram showing the transfer characteristic corresponding to section D.

Figure 6:
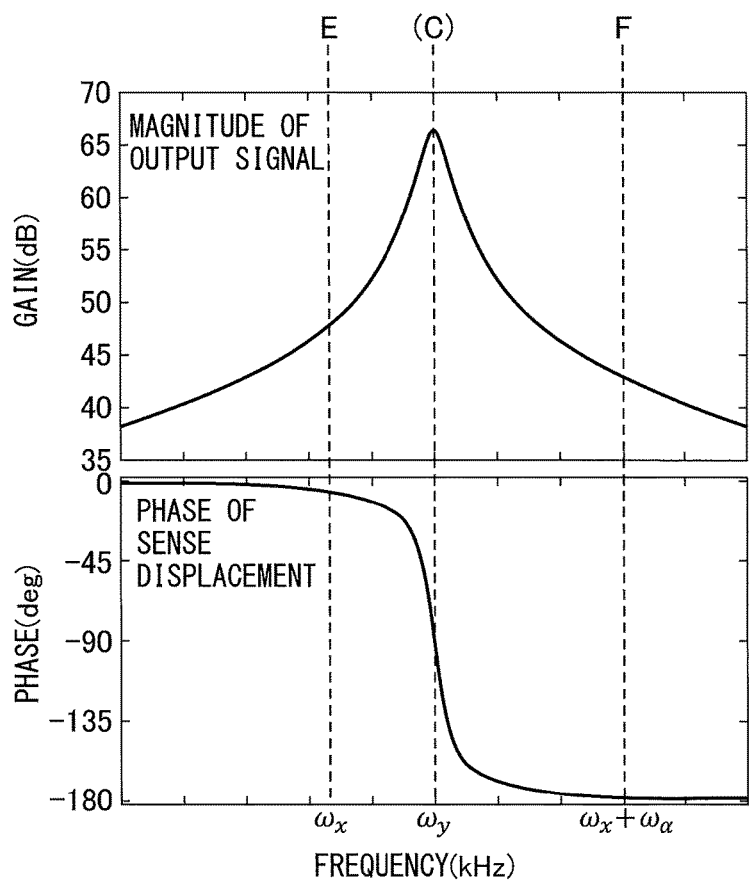
FIG. 6 is a graph showing frequency transfer characteristics of the sense system of the vibration gyro in a non-mode-matching state.
Figure 7A:
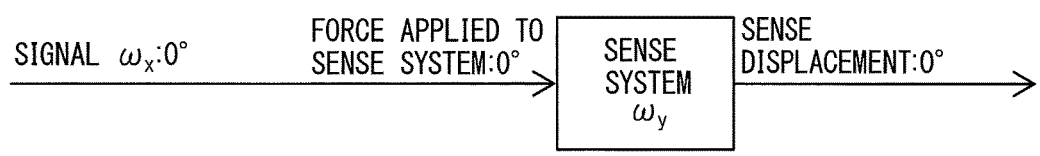
FIG. 7a is a block diagram showing transfer characteristics of the sense system of the gyro when the drive signal having the drive resonance frequency is input to the gyro in the non-mode-matching state.

FIG. 6 is similar to FIG. 4, but shows a graph of the frequency transfer characteristic of the sense system when sense system resonance frequency $\omega_y$ is different from drive system resonance frequency $\omega_x$ ($\omega_x<\omega_y$) (i.e., in the non-mode-matching state). Since the vibration gyro is driven by the drive system resonance frequency so as to detect the angular velocity, the frequency of the signal input into the sense system is normally equal to drive system resonance frequency $\omega_x$. Therefore, the phase of the signal of the sense system is nearly unchanged when the vibration gyro is driven at drive system resonance frequency $\omega_x$, i.e., the sense displacement is almost zero degree (0°) (section E in FIG. 6). FIG. 7a is a block diagram showing the transfer characteristic corresponding to section E.

Figure 7B:
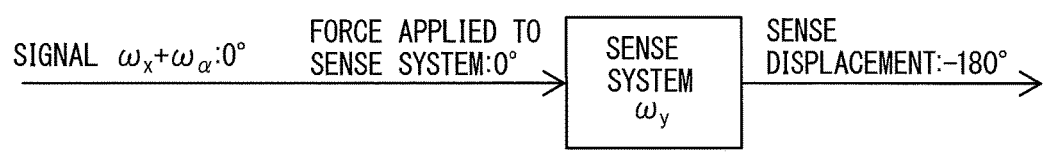
FIG. 7b is a block diagram showing transfer characteristics of the sense system of the gyro when the drive signal having the frequency higher than drive resonance frequency is input to the gyro in the non-mode-matching state.

On the other hand, when the drive signal having the frequency (e.g., $(\omega_x+\omega_\alpha)$) higher than the drive resonance frequency (and the sense resonance frequency) is input, the phase of the output signal is delayed by −180° (section F in FIG. 6). FIG. 7b is a block diagram showing the transfer characteristic corresponding to section F.

Figure 8:
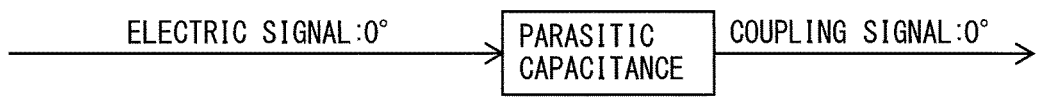
FIG. 8 is a block diagram showing frequency transfer characteristics due to an electrical coupling in the vibration gyro.

FIG. 8 is a block diagram showing the frequency transfer characteristic due to an electrical coupling (or the parasitic capacitance) in the vibration gyro. It is very easy to understand the frequency characteristic due to the electrical coupling. Concretely, in a frequency range of the vibration gyro, the phase of the coupling signal due to the parasitic capacitance is not substantially changed. In other words, the phase of the output signal is the same as the phase of the input signal. In addition, the magnitude of the signal depends on the value of the parasitic capacitance only, and the magnitude of the output signal does not depend on the frequency.

Figure 9:
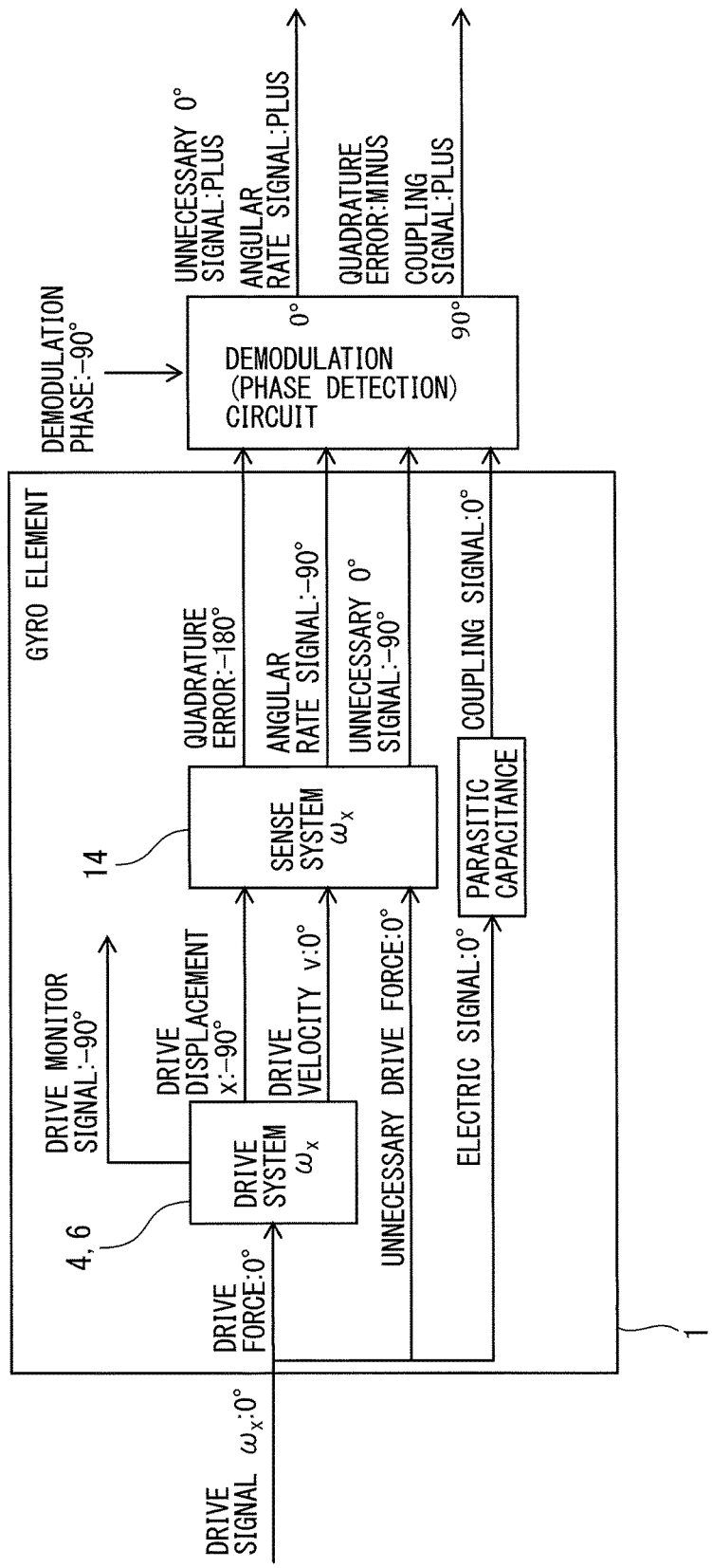
FIG. 9 is a block diagram showing a signal output when the drive signal having the drive resonance frequency is input to the gyro in the mode-matching state.

To sum the contents of FIGS. 2 to 8 up, in vibration gyro 1 including driven and vibrated drive masses 4 and 6 (or the drive system) and sense mass 14 (or the sense system) configured to be displaced by the Coriolis force generated by the angular velocity, the signal output when the drive signal having drive system resonance frequency $\omega_x$ ($=\omega_y$) is input (i.e., in the mode-matching state) is exemplified by FIG. 9. First, when the signal having drive system resonance frequency $\omega_x$ is input into gyro 1, the signal is converted into the drive force by the drive comb electrode, and then is input into the drive system. Then, drive system (drive masses 4 and 6) is started to be vibrated. The phase of a vibrational displacement x of this vibration is −90°, and the phase of the drive velocity is 0°.

Figure 10:
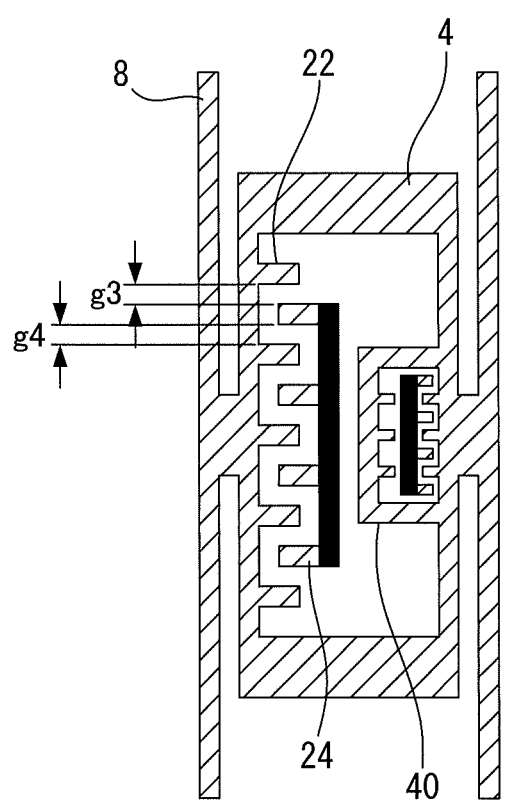
FIG. 10 is a partial enlarged view of a left-side drive mass of the vibration gyro of FIG. 1.

Next, signals applied to the sense system will be explained. The first signal is due to the Coriolis force. When gyro 1 is rotated at angular velocity Ω, Coriolis force 2 MvΩ proportional to drive velocity v and angular velocity Ω is generated, wherein "M" is a mass of the drive system. The phase of the Coriolis force is the same as drive velocity v, i.e., 0°. The second signal is due to the quadrature error. In gyro 1, due to asymmetricity of the MEMS element generated by process variations, etc., the quadrature error having the same phase as drive displacement x (i.e. −90°) is generated. The third signal is due to unnecessary drive force generated by the drive signal directly applied to the sense system. For example, as shown in FIG. 10 corresponding to a partial enlarged view of left drive mass 4 of gyro 1 of FIG. 1, the unnecessary drive force is generated when gaps g3 and g4 between drive comb electrodes (concretely, movable comb electrode 22 and fixed comb electrode 24) are not equal to each other (g3≠g4) due to the process variations and/or stress-strain, whereas gaps g3 and g4 are normally designed so that they are equal to each other (g3=g4). The phase of the signal due to the unnecessary drive force is the same as the drive signal, i.e., 0°.

As shown in FIG. 9, after the above signals pass through the sense system, the phases of the output signals from the sense system, i.e., the quadrature error signal, the angular velocity (rate) signal and the unnecessary drive force signal (or unnecessary 0° signal) due to the unnecessary drive force are −180°, −90° and −90°, respectively. Further, due to the parasitic capacitance of the MEMS element, the coupling signal having the phase of 0°, obtained when the drive signal directly passes through the electrical coupling, is also output.

The above four types of signals are transmitted to and demodulated by the phase demodulation circuit. In the first embodiment, in order to obtain the angular velocity signal by the demodulation (or phase-detection), the phase demodulation circuit is adjusted to −90° of the angular velocity signal. As shown in FIG. 9, the signal transmitted to the phase demodulation circuit is divided into a 0° signal and a 90° signal, and then is output as a phase-detection signal (or a demodulation signal).

Since the phase of either the quadrature error or the coupling signal is different from the demodulation phase (−90°) of the phase demodulation circuit by 90°, both the quadrature error and the coupling signal are output as the 90° signals, and thus these signals do not directly affect (the detected value of) the angular velocity signal. However, as shown in FIG. 9, since the phase of the unnecessary drive force signal (unnecessary 0° signal) due to the unnecessary drive force is the same as the angular velocity signal, the output unnecessary 0° signal cannot be differentiated from the angular velocity signal, whereby it is difficult to precisely detect the angular velocity signal. Further, as explained below, in the non-mode-matching state, the coupling signal may also have the same phase as the angular velocity signal. Therefore, in the embodiment as explained below, the effect of the unnecessary signals other than the quadrature error (i.e., the unnecessary 0° signal and the coupling signal) is reduced or eliminated, so as to improve the bias stability of the gyro.

Generally, the quadrature error is significantly large relative to the angular velocity signal to be detected, and may affect the detection accuracy of the angular velocity signal, and thus it may be necessary to correct or compensate the quadrature error. However, there are many conventional methods for correcting or compensating for the quadrature error, as described in JP 2013-253958 A, JP 2014-178195 A or JP 2015-203604 A, and thus a detailed explanation thereof is omitted herein.

Figure 11:
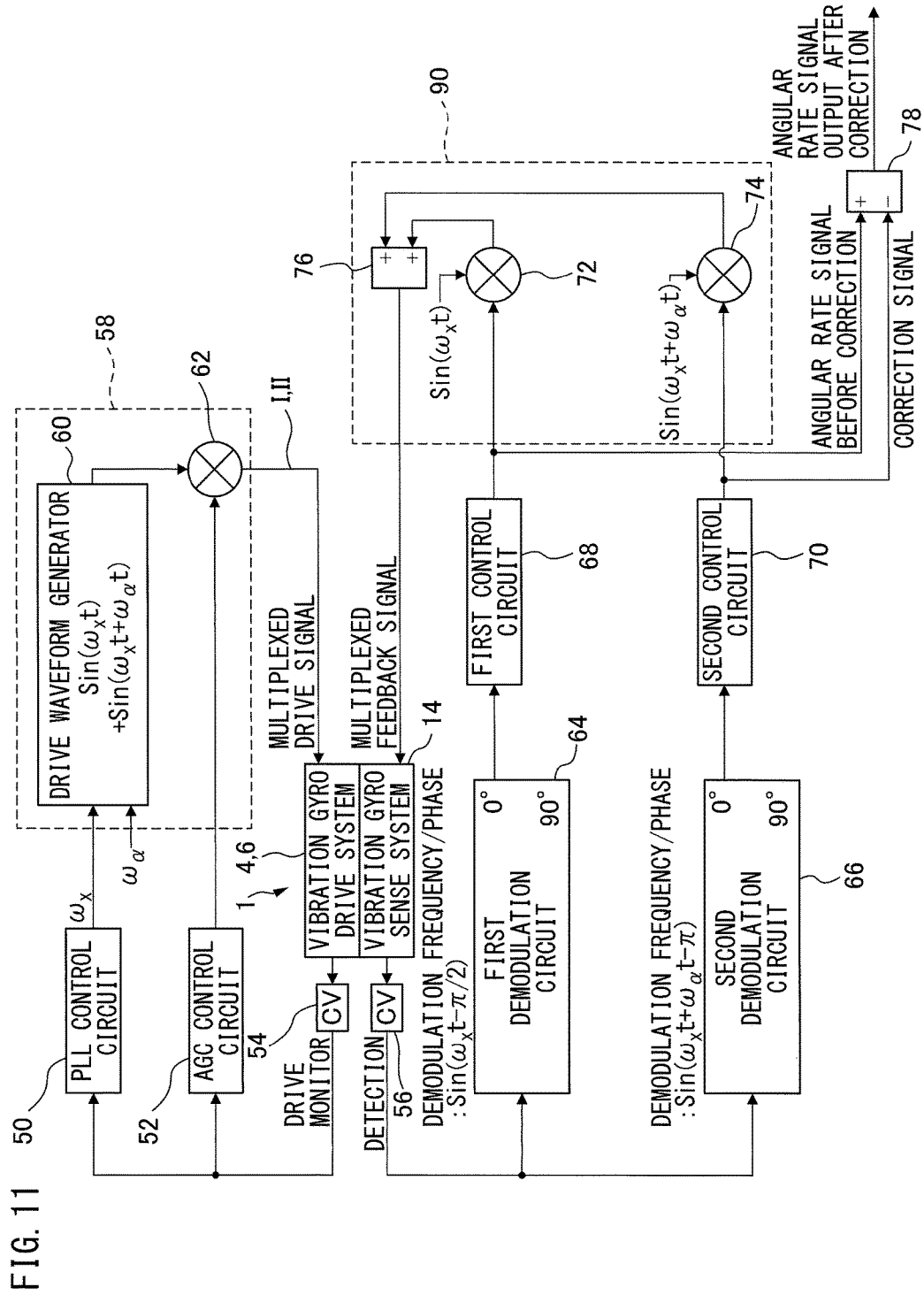
FIG. 11 is a block diagram showing a configuration of a vibration gyro according to a first embodiment of the present invention.

FIG. 11 shows the configuration of the vibration gyro according to a first embodiment of the present invention, and shows a block diagram of a feedback circuit capable of being applied to gyro element 1 as described above. A drive system control part (in the illustrated embodiment, a PLL (phase locked loop) control circuit 50 and an AGC (auto gain control) circuit 52) is associated with drive comb electrodes 24 and 28, so that drive masses 4 and 6 are controlled and driven at a predetermined anti-phase frequency and amplitude. CV converters 54 and 56 are configured to convert the electrostatic capacitance into the voltage. Concretely, CV 54 is associated with monitor fixed comb electrodes 32 and 38, and an output of CV 54 is used in the vibrational control of the drive masses. On the other hand, CV 56 converts the change in the capacitance between comb electrode 44 and sense monitor fixed comb electrodes 46 and 48, due to the rotational displacement of sense mass 14, into a voltage, and the converted voltage is transmitted as a detection signal to the phase-detection circuit (or the demodulator), as explained below.

PLL control circuit 50 outputs a first frequency corresponding to resonance frequency $\omega_x$ of drive masses 4 and 6, AGC control circuit 52 outputs a drive amplitude signal adjusted so that drive masses 4 and 6 are vibrated at the determined amplitude, and the first frequency and the drive amplitude signal are transmitted to a drive signal generating part 58. Drive signal generating part 58 generates a multiplexed drive signal by multiplexing a first drive signal I and at least one second drive signal II, first drive signal I having the first frequency corresponding to the resonance frequency of the drive masses, and at least one second drive signal II having at least one second frequency different from the first frequency (in this example, a frequency ($\omega_x+\omega_\alpha$) higher than the first frequency). Concretely, a drive waveform generating part 60 generates a multiplexed drive waveform by multiplexing (adding) a drive waveform ($\sin(\omega_x t)$) based on the first frequency and a drive waveform ($\sin(\omega_x t+\omega_\alpha t)$) based on the second frequency. Then, a modulator 62 generates the multiplexed drive signal by modulating the drive amplitude signal by using the multiplexed drive waveform.

As shown in FIG. 11, the first embodiment includes: a first demodulation circuit 64 configured to generate a first demodulation signal by demodulating the output signal of the sense system (or the sense mass) at the first frequency; a second demodulation circuit 66 configured to generate at least one second demodulation signal by demodulating the output signal of the sense system (or the sense mass) at the second frequency; a first control circuit 68 configured to generate a first feedback amplitude signal from the first demodulation signal; a second control circuit 70 configured to generate a second feedback amplitude signal from the at least one second demodulation signal; a feedback signal generating part 90 configured to generate a first multiplexed feedback signal by multiplexing a first feedback signal and at least one second feedback signal, the first feedback signal being obtained by modulating the first feedback amplitude signal at the first frequency, and the at least one second feedback signal being obtained by modulating the second feedback amplitude signal at the at least one second frequency; and a subtracter 78 configured to output an angular velocity signal by subtracting the second feedback amplitude signal from the first feedback amplitude signal. Further, feedback signal generating part 90 includes: a first modulator 72 configured to generate the first feedback signal by modulating the first feedback amplitude signal at the first frequency; a second modulator 74 configured to generate the at least one second feedback signal by modulating the second feedback amplitude signal at the at least one second frequency; and an adder 76 configured to generate the first multiplexed feedback signal by multiplexing the first feedback signal and the at least one second feedback signal.

In comparison to FIG. 11 of JP 2015-230281 A, the configuration of FIG. 11 of the embodiment is provided with a feedback path including first control circuit 68 and second control circuit 70. Therefore, in the embodiment, it is not necessary to arrange a gain (such as gain 70 in FIG. 11 of JP 2015-230281 A) and carry out gain adjustment. In other words, the configuration of FIG. 11 of JP 2015-230281 A has a correction circuit using an open loop, whereas the configuration of FIG. 11 herein (the first embodiment) has a correction circuit using a closed loop (or the feedback). Also, second and third embodiments as described below have respective correction circuits using the closed loop (or the feedback).

Figure 12A:
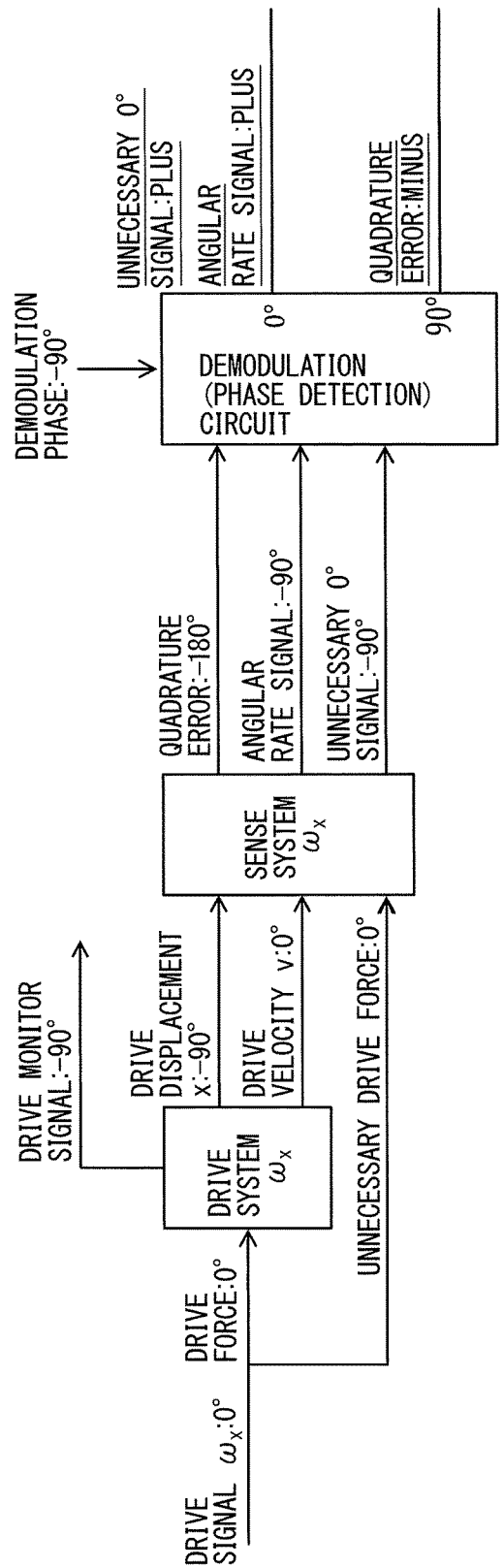
FIG. 12a is a block diagram showing a signal output when a coupling is negligible, as an example to which the first embodiment can be applied, wherein the drive masses are driven at a mode-matching resonance frequency.
Figure 12B:
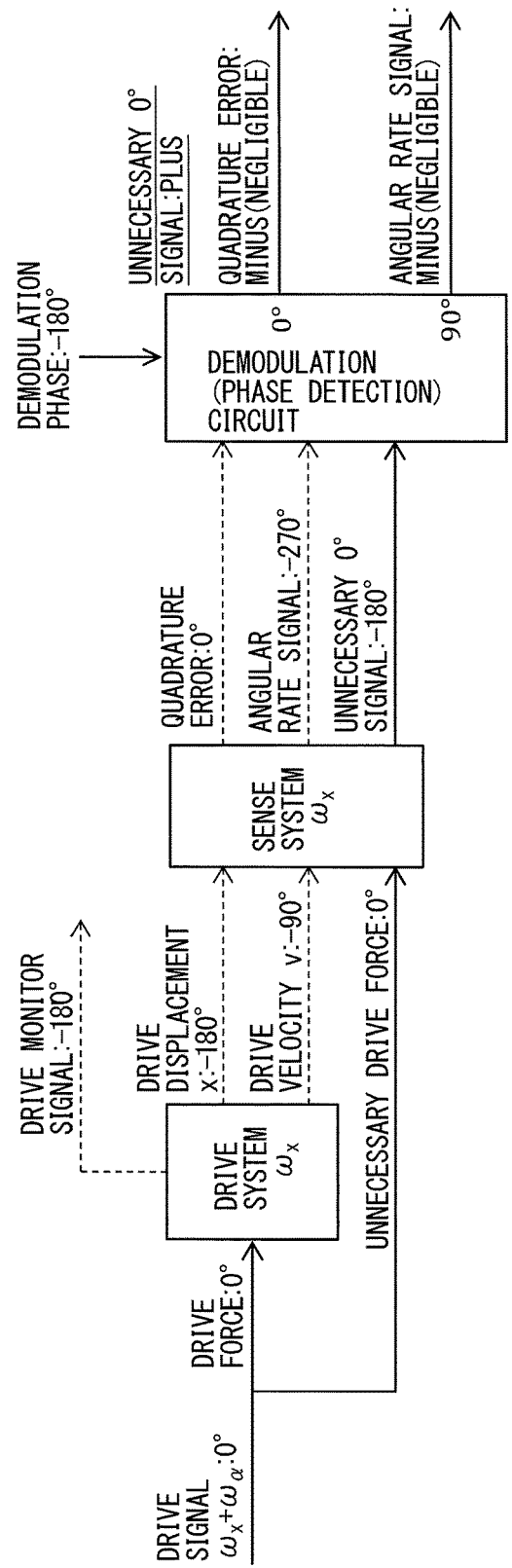
FIG. 12b is a block diagram showing a signal output when a coupling is negligible, as an example to which the first embodiment can be applied, wherein the drive masses are driven at a frequency higher than the mode-matching resonance frequency.

As simple examples to which the first embodiment can be applied, FIGS. 12a and 12b are block diagrams each indicating a signal output when the coupling does not exist (or is negligible). Concretely, FIG. 12a shows a case in which the drive masses are driven at the mode-matching resonance frequency, and FIG. 12b shows a case in which the drive masses are driven at a frequency higher than the mode-matching resonance frequency. In this case, it is preferable to simultaneously input the drive signal having resonance frequency ($\omega_x$) (FIG. 12a) and the drive signal having the frequency ($\omega_x+\omega_\alpha$) higher than the resonance frequency (FIG. 12b). In other words, as shown in FIG. 11, when the drive masses are driven by the multiplexed signal including the two signals respectively having frequencies ($\omega_x$) and ($\omega_x+\omega_\alpha$) and then the phase-detection (demodulation) is carried out at each frequency, the signal output as shown in FIGS. 12a and 12b can be obtained. Since a zero degree (0°) output in FIG. 12b is substantially the unnecessary 0° signal only, the angular velocity signal can be precisely calculated or corrected by subtracting the value of the unnecessary 0° signal from a summation of the unnecessary 0° signal and the angular velocity signal which are output in FIG. 12a.

As explained with reference to FIG. 2, the intensity of the signal output in FIG. 12a is different from that in FIG. 12b. Therefore, in the first embodiment, as shown in FIG. 11, the 0° output obtained in FIG. 12a is fed back to the sense system of the vibration gyro element via first control circuit 68 and first modulator 72. Similarly, the 0° output obtained in FIG. 12b is fed back to the sense system of the vibration gyro element via second control circuit 70 and second modulator 74. By virtue of this, the first and second control circuits function so that the unnecessary drive force as shown in FIGS. 12a and 12b is cancelled. In this case, even when the frequencies are different, the magnitudes of the unnecessary drive force are the same as long as the drive masses are driven by the drive signal having the same amplitude. Therefore, the magnitudes of the generated feedback amplitude signals for cancelling the unnecessary drive force are also the same between when the frequency is $\omega_x$ and when the frequency is $\omega_x+\omega_\alpha$.

As described above, the first feedback amplitude signal generated with respect to frequency $\omega_x$ includes the angular velocity signal and the unnecessary 0° signal, and the second feedback amplitude signal generated with respect to frequency $\omega_x+\omega_\alpha$ includes the unnecessary 0° signal only. Therefore, by subtracting the second feedback amplitude signal (or a correction signal) from the first feedback amplitude signal (or an uncorrected angular velocity signal), a precise angular velocity signal (or a corrected angular velocity signal) can be obtained. Although the signals having the resonance frequency and the higher frequency are multiplexed in the above example, signals having the resonance frequency and a frequency lower than the resonance frequency may be multiplexed. Also in this case, the corrected angular velocity signal may be obtained similarly.

Figure 13:
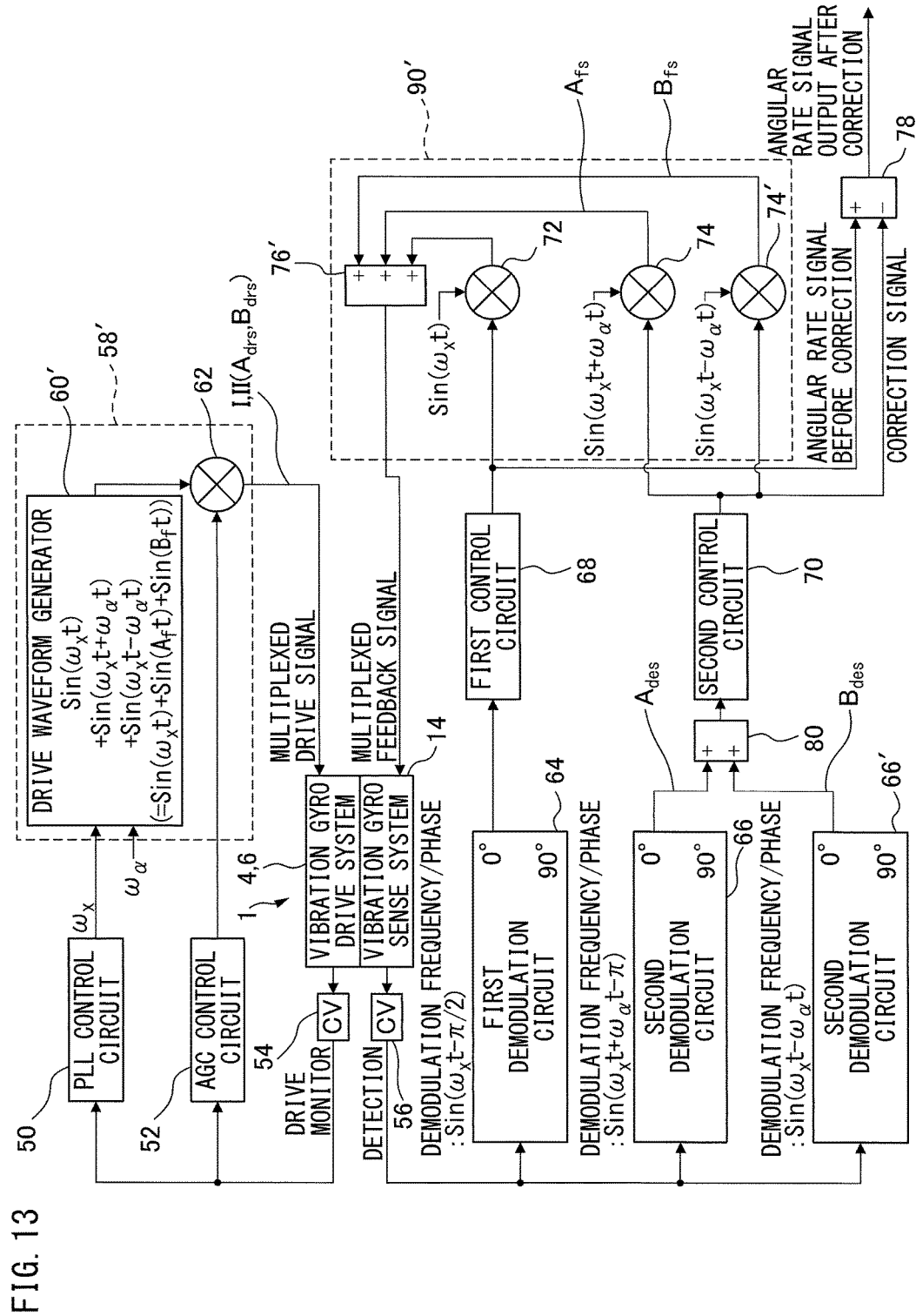
FIG. 13 is a block diagram showing a configuration of a vibration gyro according to a second embodiment of the present invention.

FIG. 13 shows the configuration of the vibration gyro according to a second embodiment of the present invention, and shows a block diagram of a feedback circuit capable of being applied to gyro element 1 as described above. Hereinafter, a part of the second embodiment different from the first embodiment is mainly explained. Therefore, in the second embodiment, the same reference numerals are used to indicate components corresponding to respective components of the first embodiment, and the detailed explanation thereof is omitted.

PLL control circuit 50 outputs a first frequency corresponding to resonance frequency $\omega_x$ of drive masses 4 and 6, AGC control circuit 52 outputs a drive amplitude signal adjusted so that drive masses 4 and 6 are vibrated at the determined amplitude, and the first frequency and the drive amplitude signal are transmitted to a drive signal generating part 58'. Drive signal generating part 58' generates a multiplexed drive signal by multiplexing a first drive signal I and at least two second drive signal II, first drive signal I having the first frequency corresponding to the resonance frequency of the drive masses, and at least two second drive signal II ($A_{drs}$ and $B_{drs}$) having at least two second frequency different from the first frequency (in this example, a frequency $A_f$ ($\omega_x+\omega_\alpha$) higher than the first frequency, and a frequency $B_f$ ($\omega_x-\omega_\alpha$) lower than the first frequency). Concretely, a drive waveform generating part 60' generates a multiplexed drive waveform by multiplexing (adding) a drive waveform (sin ($\omega_x$t)) based on the first frequency, and a drive waveform (sin($\omega_x$t+$\omega_\alpha$t) and sin($\omega_x$t−$\omega_\alpha$t)) based on second signal II ($A_{drs}$ and $B_{drs}$). Then, a modulator 62 generates the multiplexed drive signal by modulating the drive amplitude signal by using the multiplexed drive waveform.

The second embodiment includes: first demodulation circuit 64 configured to generate a first demodulation signal by demodulating the output signal of the sense system (or the sense mass) at the first frequency; and two second demodulation circuits, i.e., demodulation circuit 66 configured to generate second demodulation signal $A_{des}$ by demodulating the output signal of the sense system (or the sense mass) at second frequency $A_f$, and demodulation circuit 66' configured to generate second demodulation signal $B_{des}$ by demodulating the output signal of the sense system (or the sense mass) at second frequency $B_f$. Therefore, the second embodiment includes plural (in the illustrated embodiment, two) second demodulation circuits, the second demodulation signal includes plural (in the illustrated embodiment, two) demodulation signals $A_{des}$ and $B_{des}$, and second control circuit 70 generates a second feedback amplitude signal from a signal obtained by adding demodulation signals $A_{des}$ to $B_{des}$ using an adder 80.

Further, the second embodiment includes: a feedback signal generating part 90' configured to generate a first multiplexed feedback signal by multiplexing a first feedback signal and at least two second feedback signals, the first feedback signal being obtained by modulating the first feedback amplitude signal at the first frequency, and the at least two second feedback signals being obtained by modulating the second feedback amplitude signal at the least two second frequency, respectively; and a subtracter 78 configured to output an angular velocity signal by subtracting the second feedback amplitude signal from the first feedback amplitude signal. Further, feedback signal generating part 90' includes: a first modulator 72 configured to generate the first feedback signal by modulating the first feedback amplitude signal generated by first control circuit 68 at the first frequency; second modulators, i.e., a modulator 74 configured to generate second feedback signal $A_{fs}$ by modulating the second feedback amplitude signal at second frequency $A_f$, and a modulator 74' configured to generate second feedback signal $B_{fs}$ by modulating the second feedback amplitude signal at second frequency $B_f$; and an adder 76' configured to generate the first multiplexed feedback signal by multiplexing the first feedback signal and second feedback signals $A_{fs}$ and $B_{fs}$.

Figure 14A:
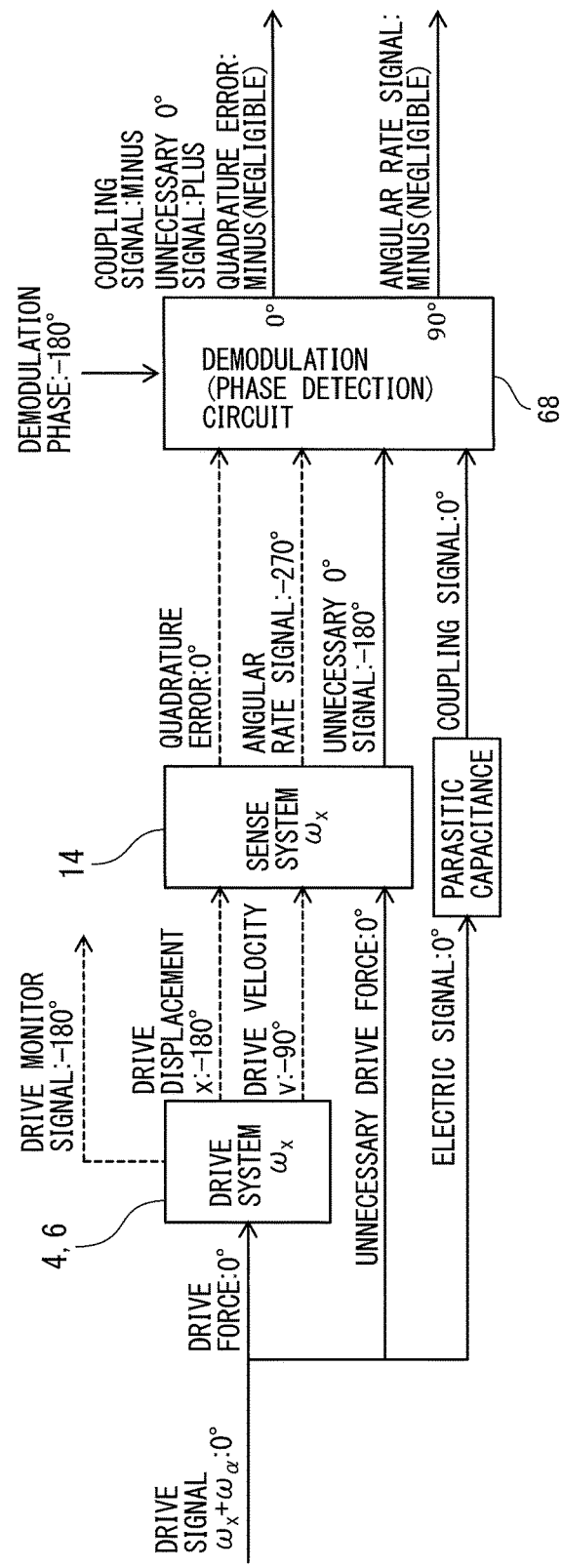
FIG. 14a is a block diagram showing a signal output when a coupling is not negligible, as an example to which the second embodiment can be applied, wherein the drive masses are driven at a mode-matching resonance frequency.
Figure 14B:
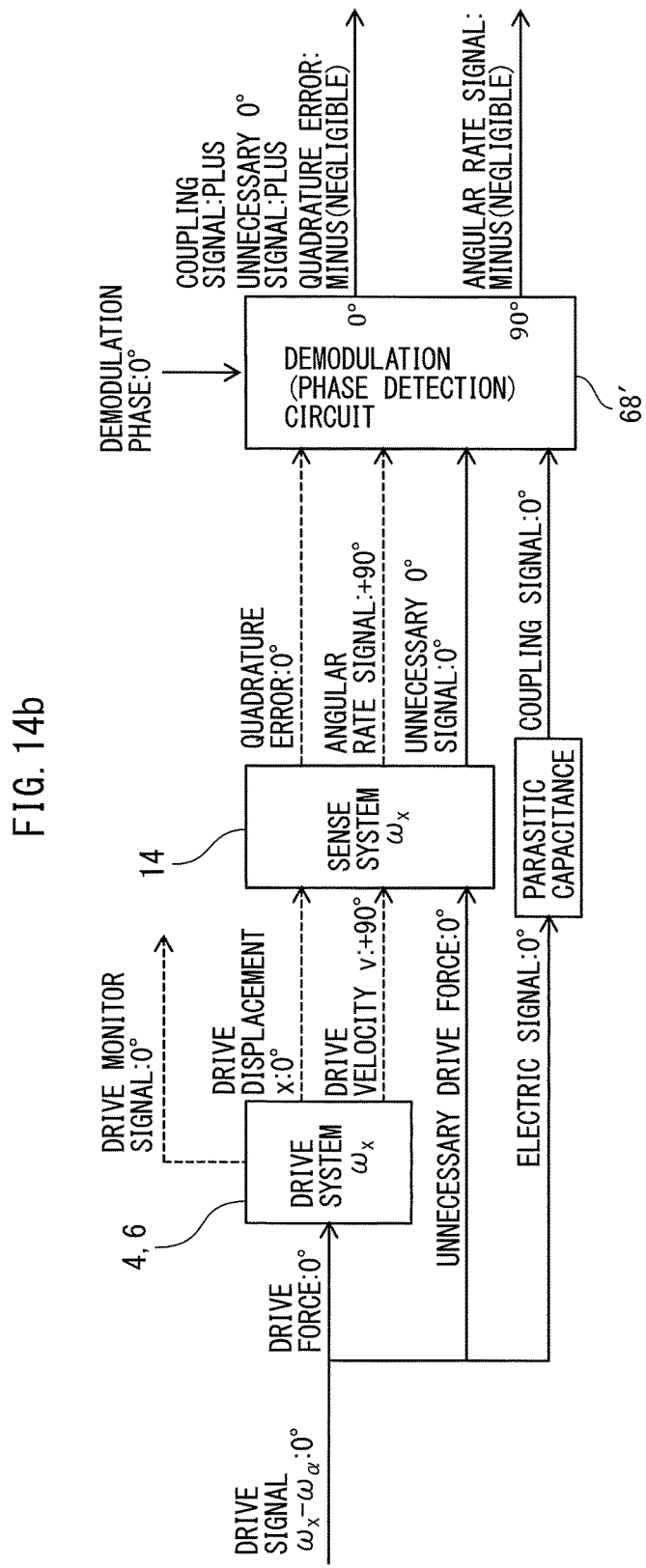
FIG. 14b is a block diagram showing a signal output when a coupling is not negligible, as an example to which the second embodiment can be applied, wherein the drive masses are driven at a frequency lower than the mode-matching resonance frequency.

As examples to which the second embodiment can be applied, FIGS. 14a and 14b are block diagrams each indicating a signal output when the coupling is not negligible. Concretely, FIG. 14a shows a case in which the drive masses are driven at a frequency higher than the mode-matching resonance frequency, and FIG. 14b shows a case in which the drive masses are driven at a frequency lower than the mode-matching resonance frequency.

In the example explained with reference to FIG. 9, the 0° output from the demodulation circuit includes both the angular velocity signal and the unnecessary 0° signal. On the other hand, in either FIG. 14a or FIG. 14b, the 0° output from the demodulation circuit includes both the coupling signal and the unnecessary 0° signal. Further, the coupling signals in FIGS. 14a and 14b have the same magnitude (absolute value) and signs (plus or minus) different from each other. Therefore, by using the configuration of the second embodiment as shown in FIG. 13, the coupling signal can be eliminated by adding 0° output signals of FIGS. 14a and 14b to each other by adder 80. After that, the second feedback amplitude signal can be generated similarly to the first embodiment.

Concretely, as shown in FIG. 13, by using adder 76', the first multiplexed feedback signal is generated by multiplexing the first feedback signal generated by first control circuit 68 and second feedback signals $A_{fs}$ and $B_{fs}$ generated by second control circuit 70, the first feedback signal being obtained by modulating the first feedback amplitude signal at the first frequency, and two second feedback signals $A_{fs}$ and $B_{fs}$ being obtained by modulating the second feedback amplitude signals at second frequencies $A_f$ and $B_f$, respectively. Then, the first multiplexed feedback signal is fed back to the sense system of the vibration gyro element. In this regard, the second feedback amplitude signal (or the correction signal) via adder 80 includes the unnecessary 0° signal only, since the coupling signal has been cancelled. Therefore, the precise (corrected) angular velocity signal can be obtained by subtracting the correction signal from the first feedback amplitude signal (or the uncorrected angular velocity signal).

Figure 15:
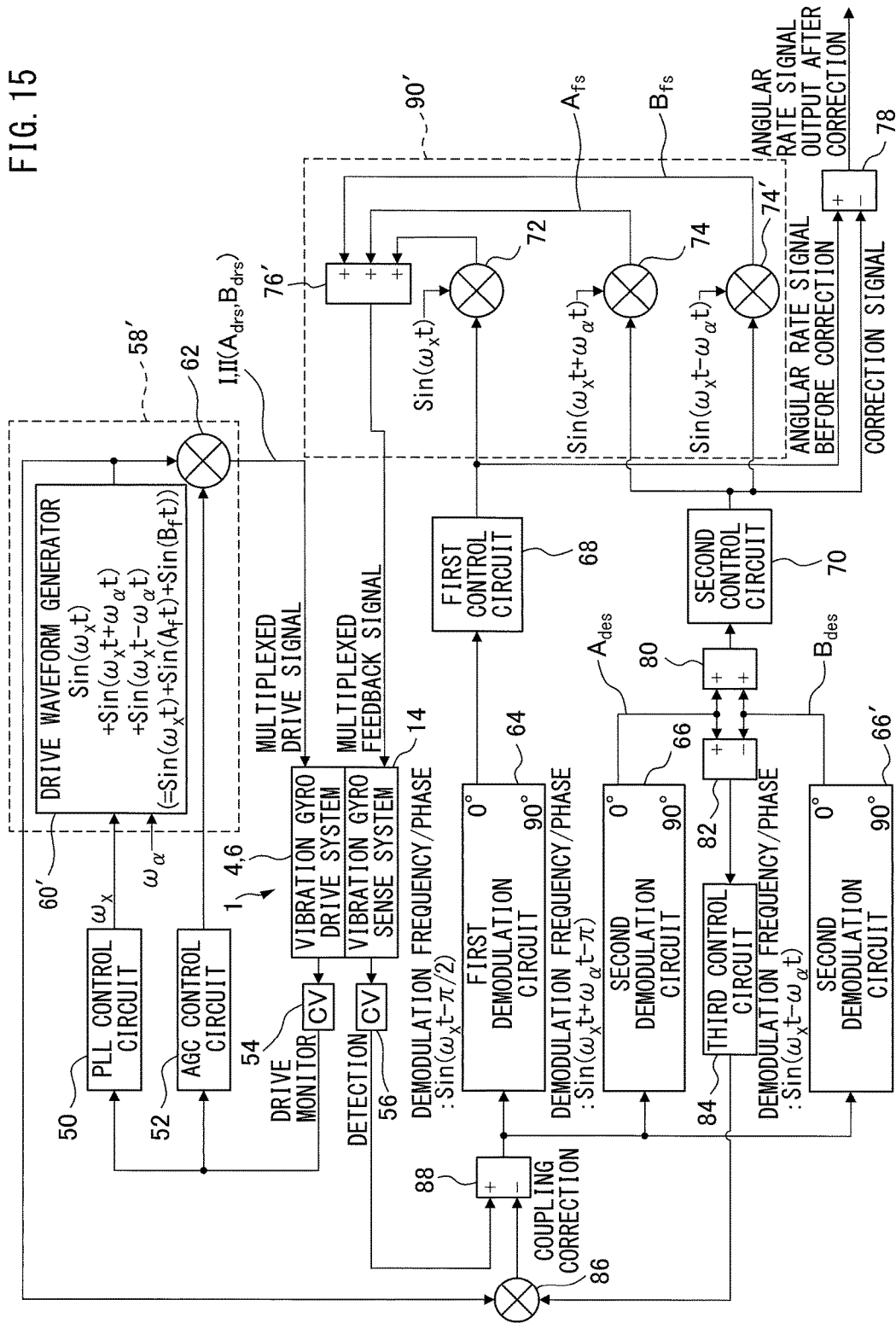
FIG. 15 is a block diagram showing a configuration of a vibration gyro according to a third embodiment of the present invention.

FIG. 15 shows the configuration of the vibration gyro according to a third embodiment of the present invention, and shows a block diagram of a feedback circuit capable of being applied to gyro element 1 as described above. Hereinafter, a part of the third embodiment different from the second embodiment is mainly explained. Therefore, in the third embodiment, the same reference numerals are used to indicate components corresponding to respective components of the second embodiment, and the detailed explanation thereof is omitted.

Similarly to the second embodiment, in the third embodiment, the second demodulation signal includes two demodulation (phase-detection) signals $A_{des}$ and $B_{des}$, and second control circuit 70 generates the second feedback amplitude signal from the signal obtained by adding demodulation signal $A_{des}$ to demodulation signal $B_{des}$ by adder 80. Further, the third embodiment includes: a subtracter 82 configured to subtract one of demodulation signals $A_{des}$ and $B_{des}$ from the other of $A_{des}$ and $B_{des}$; a third control circuit 84 generate a third feedback amplitude signal from the signal obtained by the subtraction process in subtracter 82; a third modulator 86 configured to generate a second multiplexed feedback signal by modulating the third feedback amplitude signal at the frequencies of the multiplexed drive signal (or the multiplexed drive waveform); and a subtracter 88 configured to subtract the second multiplexed feedback signal from the detection signal of sense mass 14.

Figure 16:
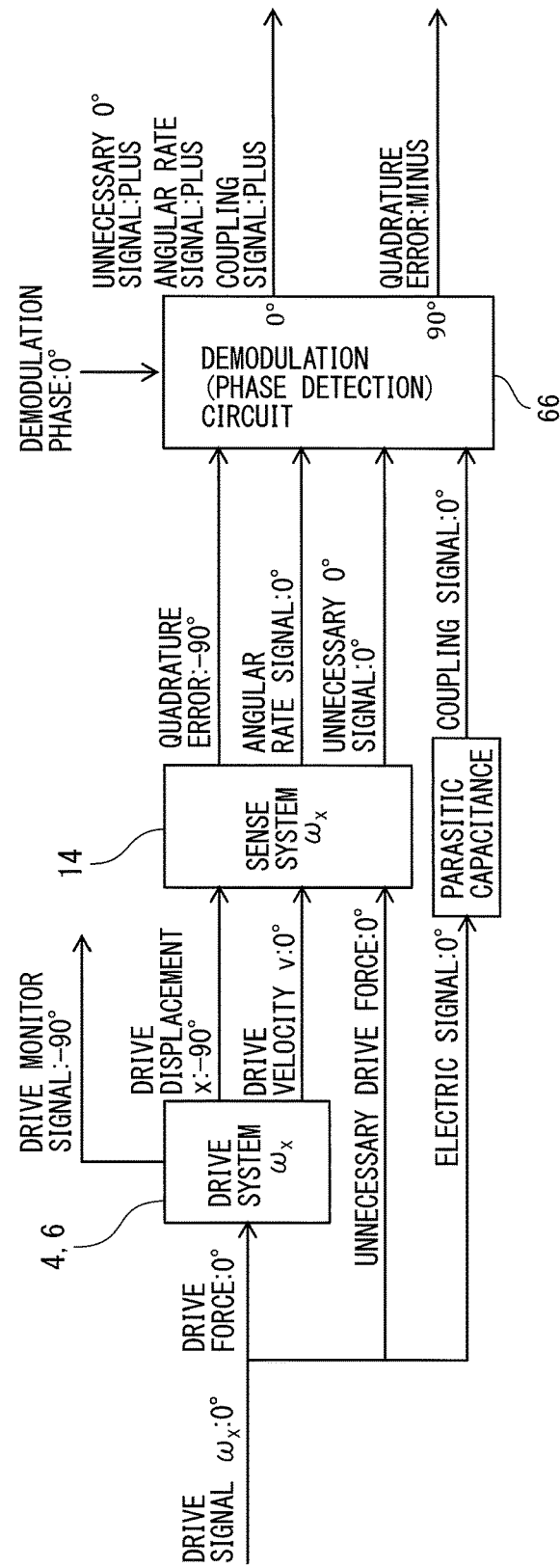
FIG. 16 is a block diagram showing a signal output in the third embodiment, wherein the drive masses are driven at a non-mode-matching resonance frequency.

The third embodiment may correspond to a configuration in which the second embodiment is provided with a feedback loop with respect to the coupling signal. In the mode-matching state with reference to FIG. 9 (in which the resonance frequencies of the drive masses and the sense mass are the same, and the drive masses are driven by the resonance frequency), the coupling signal is output at the phase different from the angular velocity signal by 90 degrees, and thus the coupling signal is not detected as the unnecessary signal. However, in the non-mode-matching state as shown in FIG. 16, the coupling signal and the angular velocity signal are output at the same phase, and it may be necessary to correct the angular velocity signal. Further, even if the coupling signal is output at the phase different from the angular velocity signal by 90 degrees in the mode-matching state, when the magnitude of the coupling signal is excessively large, it may be necessary to correct the angular velocity signal due to the effect of the coupling signal.

Therefore, in the third embodiment as shown in FIG. 15, in addition to the second embodiment, third control circuit 84 generates the third feedback amplitude signal by using the signal obtained by the subtraction process in subtracter 82, third modulator 86 modulates the third feedback amplitude signal at the frequencies of the multiplexed drive signal (or the multiplexed drive waveform) so as to generate the second multiplexed feedback signal, and subtracter 88 subtracts the generated second multiplexed feedback signal from the output signal of the sense mass.

The process in the third embodiment utilizes that the coupling signal can be extracted by the subtraction process with respect to the signals of FIGS. 14a and 14b, similarly to the second embodiment in which the unnecessary 0° signal only is extracted by the addition process with respect to the signals of FIGS. 14a and 14b. In this regard, the magnitudes of the unnecessary 0° signal in FIGS. 14a and 14b are not always the same, and thus it may not be possible to remove the unnecessary 0° signal and extract the precise (pure) coupling signal only, by the simple subtraction process. Therefore, in the third embodiment, similarly to the second embodiment, the circuits are configured to cancel the unnecessary drive force before the sense mass, by feeding back the signal obtained by adding the signals of FIGS. 14a and 14b to each other to sense mass 14. By virtue of this, the unnecessary 0° signal (i.e., the output signal regarding the unnecessary drive force) has been corrected before the sense mass, whereby the unnecessary 0° signal is not output from the demodulation circuit.

As a result of the above process, only the coupling signal is output as the 0° signal from the demodulation circuit in FIGS. 14a and 14b. Therefore, only the coupling signal can be detected by the subtraction process (substantially the addition process, since the coupling signals of FIGS. 14a and 14b are differential outputs having the phases different from each other by 180 degrees). Further, by feeding back the detected coupling signal before the demodulation circuit via third control circuit 84 (or by correcting the output of the sense mass immediately after the sense mass by subtracting the coupling signal therefrom), the coupling signal is removed from the output of the sense mass before the demodulation circuit, whereby each demodulation circuit can detect the value which does not include the coupling signal. As explained above, in the third embodiment, the coupling signal can be appropriately corrected, and the other circuits and the processes may be the same as in the second embodiment, whereby the precise (corrected) angular velocity signal can be obtained.

In the first, second or the third embodiment, the vibration gyro is driven by the signal obtained by multiplexing the first and second drive signals, wherein the first drive signal is adjusted so as to correspond to the resonance frequency of the drive masses for detecting the angular velocity signal, and the second drive signal has one or more frequency different from the resonance frequency of the drive masses for detecting/correcting the signal of the unnecessary component. Then, the detection signal of the sense mass is demodulated by the signal at each frequency, and each demodulation signal is multiplied and fed back to the sense system. By virtue of this, the angular velocity signal including the unnecessary signal, and the correction signal including only the unnecessary signal can be detected, whereby the pure (extremely precise) angular velocity signal can be obtained by subtracting the unnecessary signal from the angular velocity signal.

In each block diagram such as FIG. 9 representing the signal output, the major (non-negligible) signal is indicated by a solid line, and the sufficiently small (negligible) signal is indicated by a dotted line. A numeral described after a character ":" in each name of the (AC) signal indicates the output phase. On the other hand, since the signal after the demodulation circuit is a DC signal, a character described after ":" indicates a sign (plus or minus) of the signal. Further, among the signals after the demodulation circuit, the sufficiently small and negligible signal is provided with a description "negligible."

In the above preferred embodiment of the present invention, the vibration gyro has the sense mass configured to be rotatably excited by the Coriolis force generated by the angular velocity, and the pair of drive masses positioned inside the sense mass so that the drive masses are driven and vibrated in the anti-phase vibration mode. However, the present invention can be applied to the other type of vibration gyro, as long as the gyro has a sense mass configured to be displaced by inputting the angular velocity to the gyro. Further, the present invention can also be applied to the other type of vibration gyro, in which the drive mass and the sense mass are formed as a substantially integrated structure, and the integrated structure has both functions of the drive mass and the sense mass.

In addition, the present invention can also be applied to the vibration gyro having the AC comb electrode and the DC comb electrode for limiting the quadrature error, as disclosed in JP 2013-253958 A, etc. In other words, the bias correction as in the present invention and the quadrature limitation can be simultaneously carried out.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A vibration gyro comprising:
   drive masses configured to be driven and vibrated;
   a sense mass configured to be displaced by a Coriolis force generated by an angular velocity;
   a drive signal generating part configured to generate a multiplexed drive signal by multiplexing a first drive signal and at least one second drive signal, the first drive signal having a first frequency corresponding to a resonance frequency of the drive masses, and the at least one second drive signal having at least one second frequency different from the first frequency;
   a first demodulation circuit configured to generate a first demodulation signal by demodulating a detection signal of the sense mass at the first frequency;
   at least one second demodulation circuit configured to generate at least one second demodulation signal by demodulating the detection signal of the sense mass at the at least one second frequency;
   a first control circuit configured to generate a first feedback amplitude signal from the first demodulation signal;
   a second control circuit configured to generate a second feedback amplitude signal from the at least one second demodulation signal;
   a feedback signal generating part configured to generate a first multiplexed feedback signal by multiplexing a first feedback signal and at least one second feedback signal, the first feedback signal being obtained by modulating the first feedback amplitude signal at the first frequency, and the at least one second feedback signal being obtained by modulating the second feedback amplitude signal at the at least one second frequency; and
   a subtracter configured to output an angular velocity signal by subtracting the second feedback amplitude signal from the first feedback amplitude signal.

2. The vibration gyro as set forth in claim 1, wherein:
   the at least one second frequency includes a frequency $A_f$ higher than the first frequency and the resonance frequency of the sense mass, and a frequency $B_f$ lower than the first frequency and the resonance frequency of the sense mass;
   the at least one second drive signal includes a drive signal $A_{drs}$ having the frequency $A_f$ and a drive signal $B_{drs}$ having the frequency $B_f$;
   the at least one second demodulation signal includes a demodulation signal $A_{des}$ demodulated at the frequency $A_f$ and a demodulation signal $B_{des}$ demodulated at the frequency $B_f$;
   the second control circuit generates the second feedback amplitude signal by using a signal obtained by adding the demodulation signal $A_{des}$ to the demodulation signal $B_{des}$; and
   the at least one second feedback signal includes a feedback signal $A_{fs}$ obtained by modulating the second feedback amplitude signal at the frequency $A_f$, and a feedback signal $B_{fs}$ obtained by modulating the second feedback amplitude signal at the frequency $B_f$.

3. The vibration gyro as set forth in claim 2, further comprising:
   a third control circuit configured to generate a third feedback amplitude signal from a signal obtained by subtraction process of the demodulation signal $A_{des}$ and the demodulation signal $B_{des}$;
   a modulator configured to generate a second multiplexed feedback signal by modulating the third feedback amplitude signal at frequencies of the multiplexed drive signal; and
   a subtracter configured to obtain a signal by subtracting the second multiplexed feedback signal from the detection signal of the sense mass, and feedback the obtained signal to the first and second demodulation circuits.

4. A method of using a vibration gyro including drive masses configured to be driven and vibrated and a sense mass configured to be displaced by a Coriolis force generated by an angular velocity, the method comprising the steps of:
   generating a multiplexed drive signal by multiplexing a first drive signal and at least one second drive signal, the first drive signal having a first frequency corresponding to a resonance frequency of the drive masses, and the at least one second drive signal having at least one second frequency different from the first frequency;
   generating a first demodulation signal by demodulating a detection signal of the sense mass at the first frequency;
   generating at least one second demodulation signal by demodulating the detection signal of the sense mass at the at least one second frequency;
   generating a first feedback amplitude signal from the first demodulation signal;
   generating a second feedback amplitude signal from the at least one second demodulation signal;
   generating a first feedback signal by modulating the first feedback amplitude signal at the first frequency;

generating at least one second feedback signal by modulating the second feedback amplitude signal at the at least one second frequency;

generating a first multiplexed feedback signal by multiplexing the first feedback signal and the at least one second feedback signal, the first multiplexed feedback signal being fed back to the vibration gyro; and outputting an angular velocity signal obtained by subtracting the second feedback amplitude signal from the first feedback amplitude signal.

5. The method as set forth in claim 4, wherein:

the at least one second frequency includes a frequency $A_f$ higher than the first frequency and the resonance frequency of the sense mass, and a frequency $B_f$ lower than the first frequency and the resonance frequency of the sense mass;

the at least one second drive signal includes a drive signal $A_{drs}$ having the frequency $A_f$ and a drive signal $B_{drs}$ having the frequency $B_f$;

the at least one second demodulation signal includes a demodulation signal $A_{des}$ demodulated at the frequency $A_f$ and a demodulation signal $B_{des}$ demodulated at the frequency $B_f$;

the method further comprises the step of:

generating the second feedback amplitude signal by using a signal obtained by adding the demodulation signal $A_{des}$ to the demodulation signal $B_{des}$, wherein the at least one second feedback signal includes a feedback signal $A_{fs}$ obtained by modulating the second feedback amplitude signal at the frequency $A_f$, and a feedback signal $B_{fs}$ obtained by modulating the second feedback amplitude signal at the frequency $B_f$.

6. The method as set forth in claim 5, further comprising the steps of:

generating a third feedback amplitude signal from a signal obtained by subtraction process of the demodulation signal $A_{des}$ and the demodulation signal $B_{des}$;

generating a second multiplexed feedback signal by modulating the third feedback amplitude signal at frequencies of the multiplexed drive signal; and subtracting the second multiplexed feedback signal from the detection signal of the sense mass.

* * * * *